(12) United States Patent
Leising et al.

(10) Patent No.: US 6,872,490 B2
(45) Date of Patent: Mar. 29, 2005

(54) PREPARATION FOR A CATHODE MATERIAL BY A TWO-STEP REDUCTION/ OXIDATION SYNTHESIS PROCESS

(75) Inventors: Randolph Leising, Williamsville, NY (US); Esther S. Takeuchi, East Amherst, NY (US)

(73) Assignee: Wilson Greatbatch Technologies, Inc., Clarence, NY (US)

( * ) Notice: Subject to any disclaimer, the term of this patent is extended or adjusted under 35 U.S.C. 154(b) by 366 days.

(21) Appl. No.: 10/214,813

(22) Filed: Aug. 8, 2002

(65) Prior Publication Data

US 2003/0059680 A1 Mar. 27, 2003

Related U.S. Application Data

(60) Provisional application No. 60/311,483, filed on Aug. 9, 2001.

(51) Int. Cl.[7] .................................................. H01M 4/54
(52) U.S. Cl. .................. 429/219; 429/231.5; 429/231.9
(58) Field of Search ............................. 429/219, 231.5, 429/231.9

(56) References Cited

U.S. PATENT DOCUMENTS

| | | | |
|---|---|---|---|
| 4,310,609 A | | 1/1982 | Liang et al. |
| 4,391,729 A | * | 7/1983 | Liang et al. ............. 252/182.1 |
| 4,965,151 A | | 10/1990 | Takada et al. |
| 5,221,453 A | | 6/1993 | Crespi |
| 5,389,472 A | | 2/1995 | Takeuchi et al. |
| 5,545,497 A | | 8/1996 | Takeuchi et al. |
| 5,670,276 A | | 9/1997 | Takeuchi et al. |
| 5,695,892 A | | 12/1997 | Leising et al. |
| 5,895,733 A | | 4/1999 | Crespi et al. |
| 5,955,218 A | | 9/1999 | Crespi et al. |
| 6,093,506 A | | 7/2000 | Crespi et al. |
| 6,566,007 B1 | * | 5/2003 | Takeuchi et al. ............ 429/219 |

FOREIGN PATENT DOCUMENTS

| | | |
|---|---|---|
| EP | 0 618 630 A1 | 5/1994 |
| EP | 0 856 490 A1 | 5/1998 |
| EP | 1 113 514 A1 | 4/2001 |

OTHER PUBLICATIONS

Solid–State Cathode Materials for Lithium Batteries: Effect of Synthesis Temperature on the Physical and Electrochemical Properties of Silver Vanadium Oxide. Randolph A Leising and Esther Sans Takeuchi. Chem. Mater, vol. 5, No. 5, 1993.
Leising, R.A., Takeuchi, E.S., *Chem. Mater.* 1993,5,738–742.
Leising, R.A., Takeuchi, E.S. *Chem. Mater.* 1994,6,489–495.
Fleury, P., Kohlmulller, R.C.R. *Acad. Sci. Paris* 1996,262C, 475–477.
Caselot, A., Pouchard, M. *Bell Soc. Chim. Fr.* 1997,3817–3820.
Wendal E.J. *Thermal Anal.* 1985,30,879–887.

* cited by examiner

*Primary Examiner*—Dah-Wei Yuan
(74) *Attorney, Agent, or Firm*—Michael F. Scalise

(57) ABSTRACT

The current invention provides a method of preparing a cathode material in a sequential two-part reaction process. In the first step, silver nitrate and vanadium oxide are decomposed by heat under an inert atmosphere. In the second part of the process, the resulting intermediate material is heat treated under an oxidizing atmosphere. The sequential combination of steps produces a highly crystalline silver vanadium oxide cathode material which has properties not heretofore exhibited by SVO prepared by prior art methods.

34 Claims, 4 Drawing Sheets

PREPARATION FOR A CATHODE MATERIAL BY A TWO-STEP REDUCTION/OXIDATION SYNTHESIS PROCESS

CROSS REFERENCE TO RELATED APPLICATION

This application claims priority based on provisional application Ser. No. 60/311,483, filed Aug. 9, 2001.

BACKGROUND OF THE INVENTION

1. Field of the Invention

The present invention generally relates to the conversion of chemical energy to electrical energy. More particularly, this invention relates to the preparation of a new cathode active material for nonaqueous electrolyte lithium electrochemical cells. The cathode material comprises a highly crystalline mixed metal oxide, such as $\epsilon$-phase silver vanadium oxide (SVO, $Ag_2V_4O_{11}$), prepared using a two-step synthesis process.

In an exemplary synthesis, silver nitrate ($AgNO_3$) is first reacted with vanadium oxide ($V_2O_5$) in a decomposition reaction under an inert atmosphere, resulting in an SVO intermediate having a reduced stoichiometric oxygen content. The SVO intermediate is then subjected to a separate oxidation reaction to produce the highly crystalline product SVO. The synthesis protocol of the decomposition reaction followed by the oxidation reaction produces a cathode active material with increased crystallinity and increased surface area, which cannot be obtained by prior art methods.

2. Prior Art

U.S. Pat. Nos. 4,310,609 and 4,391,729, both to Liang et al., disclose the preparation of silver vanadium oxide by a thermal decomposition reaction of silver nitrate with vanadium oxide conducted under an air atmosphere. This decomposition reaction is further detailed in the publication: Leising, R. A.; Takeuchi, E. S. *Chem. Mater.* 1993, 5, 738–742, where the decomposition synthesis of SVO from silver nitrate and vanadium oxide under an air atmosphere is presented as a function of temperature.

In another reference: Leising, R. A.; Takeuchi, E. S. *Chem. Mater.* 1994, 6, 489–495, the decomposition synthesis of SVO from different silver precursor materials (silver nitrate, silver nitrite, silver oxide, silver vanadate, and silver carbonate) is described. In this publication, the heating temperature is held constant at about 500° C. and the synthesis occurs under an air or argon atmosphere.

Interestingly, SVO materials prepared in a decomposition reaction under an argon atmosphere have very different thermal properties, x-ray diffraction patterns, and electrochemical discharge properties than SVO samples similarly prepared under air. In the latter Leising et al. publication, the product of the decomposition reaction under argon is a mixture of phases of SVO materials. Multi-phase SVO is not the same as a highly crystalline $\epsilon$-phase $Ag_2V_4O_{11}$.

In addition, the electrochemical discharge properties of lithium test cells demonstrate that multi-phase SVO prepared under an argon atmosphere has significantly less useable capacity than SVO prepared under an oxidizing atmosphere. Thus, the prior art teaches away from the use of an inert gas, such as argon, in the synthesis protocol of a mixed metal oxide, such as a highly crystalline SVO.

In comparison to SVO prepared by a decomposition reaction, U.S. Pat. No. 5,221,453 to Crespi discloses the synthesis of silver vanadium oxide by a chemical addition reaction of silver oxide and vanadium oxide starting materials. Crespi's chemical addition or combination reaction is described as a single step synthesis where the heating takes place in an inert atmosphere or separately in an oxidizing atmosphere. No combination of atmospheres, or combination of heating steps, is disclosed.

Also, the preparation of SVO from silver oxide and vanadium oxide is well documented in the literature. In the publications: Fleury, P.; Kohlmuller, R. C. R. *Acad. Sci. Paris* 1966, 262C, 475–477, and Casalot, A.; Pouchard, M. *Bull Soc. Chim. Fr.* 1967, 3817–3820, the reaction of silver oxide with vanadium oxide is described. Wenda, E. *J. Thermal Anal.* 1985, 30, 879–887, presents a phase diagram of the $Ag_2O$-$V_2O_5$ system in which the starting materials are heated under oxygen to form SVO and other silver vanadium oxide materials. It is significant to note that Fleury and Kohlmuller commented that the thermal analysis of the $Ag_2O$-$V_2O_5$ system should be conducted under flowing oxygen to avoid the in-situ formation of bronzes. Bronzes of silver vanadium oxide are referred to as $Ag_xV_2O_5$ type materials, which include significant amounts of unreacted vanadium(IV). An $\epsilon$-phase SVO ($Ag_2V_4O_{11}$) is not a bronze, since it only contains vanadium(V). Thus, Fleury and Kohlmuller were warning that the heat treatment of SVO starting materials under a non-oxidizing atmosphere (such as argon) results in the formation of reduced stoichiometric silver vanadium oxide products.

U.S. Pat. No. 5,955,218 to Crespi et al. discloses the process of heat-treating thermal decomposition produced SVO to improve the material's electrochemical performance. In this patent, SVO is first synthesized in a decomposition reaction under air, as described in U.S. Pat. Nos. 4,310,609 and 4,391,729, both to Liang et al., however, at a somewhat lower temperature of 360° C. The '218 patent to Crespi et al. demonstrates that adding a second oxidation heat treatment to the Liang et al. decomposition reaction product increases the crystallinity of the resulting SVO material. However, the Crespi et al. SVO material of increased crystallinity still does not have the highly crystalline characteristics of the SVO material of the present invention.

SUMMARY OF THE INVENTION

The current invention provides a method for preparing a highly crystalline cathode active material by a sequential two-step synthesis process. In the first step, a mixture of starting materials including at least one decomposable constituent is heated to decomposition under an inert atmosphere. In the second part of the process, the product decomposition material is heat treated under an oxidizing atmosphere. When SVO is the desired result, preferred starting materials are a mixture of silver nitrate and vanadium oxide. Vanadium oxide can have any one of a number of its forms including $NH_4VO_3$, $AgVO_3$, $VO$, $VO_{1.27}$, $VO_2$, $V_2O_4$, $V_2O_3$, $V_3O_5$, $V_4O_9$, $V_6O_{13}$ and $V_2O_5$. This sequential combination of syntheses produces a highly crystalline silver vanadium oxide cathode material, which has properties not exhibited by SVO prepared according to prior art methods.

These and other aspects of the present invention will become more apparent to those skilled in the art by reference to the following description and to the appended drawings.

DETAILED DESCRIPTION OF THE PREFERRED EMBODIMENTS

Figure 1:
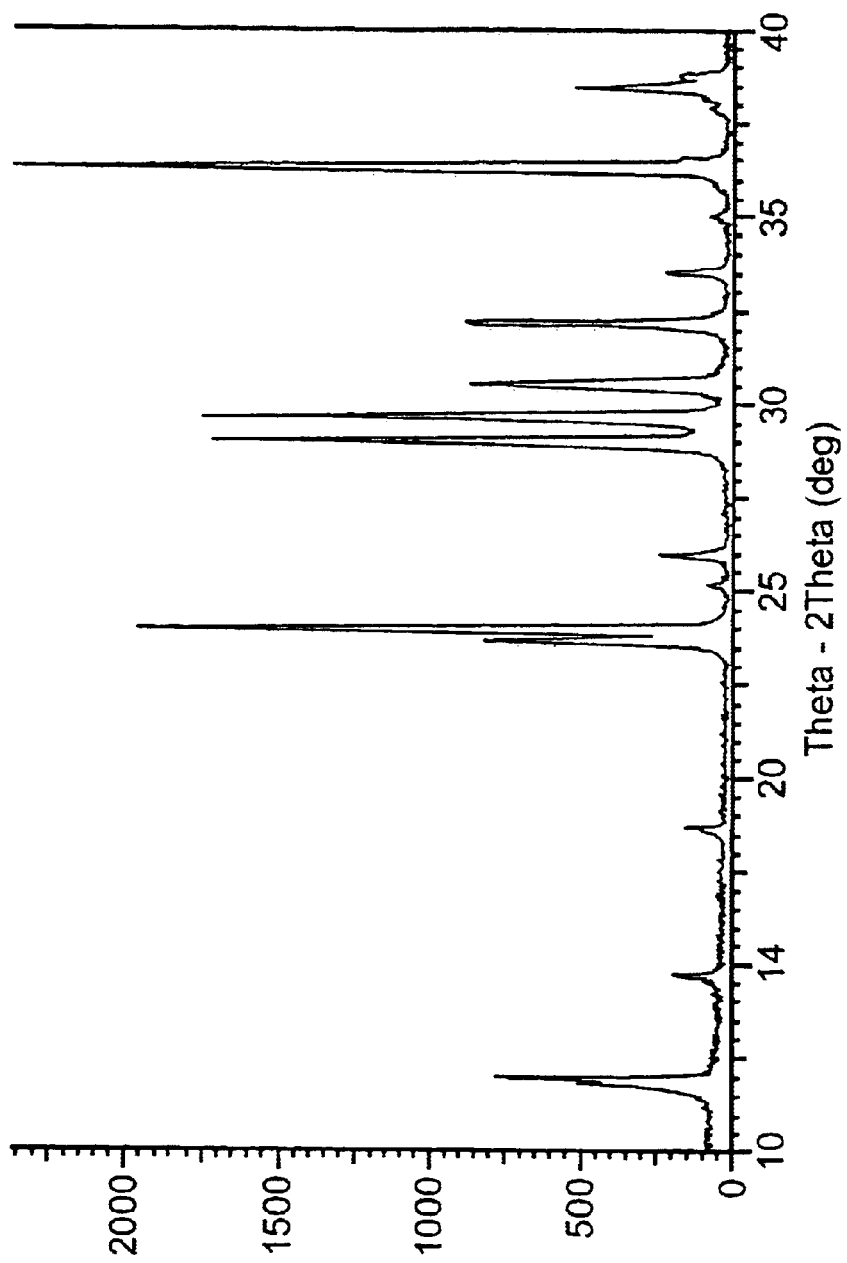
FIGS. 1 and 2 depict various x-ray diffraction spectra for a highly crystalline SVO according to the present invention in comparison to that of the prior art, respectively.

Crystallinity or crystallite size (L) is defined by the Scherrer equation:

$$L = \frac{(0.9)(1.540562)}{(FWHM)(\Pi/180)(\cos[(2theta/4)(\Pi/180)])}$$

In this equation, (0.9) is a constant, (1.540562) is the wavelength of the incident radiation (Cu Kalpha) used in the experiment, and FWHM is the full width at half max of the peak being examined. The Scherrer equation relates the FWHM parameter to L, which describes the extent or particle size of the crystallite in a particular direction (the direction defined by the peak being examined) in angstroms. The width of the peak (FWHM) decreases as the thickness of the crystal increases, thus, samples displaying smaller FWHM values are of higher crystallinity.

The thermal reaction of silver nitrate with vanadium oxide under an air atmosphere is a typical example of an oxidation decomposition preparation of silver vanadium oxide. This reaction is the subject of the previously discussed U.S. Pat. Nos. 4,310,609 and 4,391,729 to Liang et al., and is set forth below in Equation 1:

$$2AgNO_3 + 2V_2O_5 \rightarrow Ag_2V_4O_{11} + 2NO_x \quad (1)$$

The physical characteristics of the SVO material (i.e., particle morphology, surface area, crystallinity, etc.) produced by this reaction are dependent on the temperature and time of reaction. In addition, the reaction atmosphere has a dramatic effect on the product material. The same reaction of silver nitrate with vanadium oxide conducted under an argon atmosphere is depicted below in Equation 2:

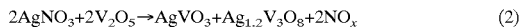
$$2AgNO_3 + 2V_2O_5 \rightarrow AgVO_3 + Ag_{1.2}V_3O_8 + 2NO_x \quad (2)$$

The decomposition synthesis of SVO under an inert argon atmosphere forms a mixture of silver vanadate ($AgVO_3$) and γ-phase SVO ($Ag_{1.2}V_3O_8$). This is described in the above-referenced publication Leising, R. A.; Takeuchi, E. S. *Chem. Mater.* 1994, 6, 489–495. As reported by Leising et al., a mixed phase material is less desirable as a cathode material for lithium electrochemical cells than a highly crystalline ε-phase SVO ($Ag_2V_4O_{11}$). For this reason, argon is typically not preferred for the decomposition synthesis of SVO cathode active material.

The present invention, however, further synthesizes the mixture of phases produced by the thermal decomposition reaction in an inert atmosphere depicted in Equation 2 into a highly crystalline ε-phase SVO ($Ag_2V_4O_{11}$) by subsequent heating under an oxidizing atmosphere. The present reaction sequence produces a ε-phase SVO having increased crystallinity in comparison to ε-phase SVO produced by successive thermal decomposition reactions under oxidizing atmospheres, i.e., the previously described U.S. Pat. No. 5,955,218 to Crespi et al.

Additionally, the subsequent oxidative heat treatment of an SVO intermediate having a reduced stoichiometric oxygen content, i.e., Equation 2, according to the present invention produces a cathode active material having a larger surface area than SVO produced solely by oxidative thermal decomposition. Increased crystal structure is desirable since it provides a cathode material with increased stability for longer periods of time in the presence of organic electrolytes. Increased surface area is also desirable because it provides a cathode material with improved rate capability.

The present SVO material having increased crystallinity is unexpected because the intermediate SVO material is a mixture of phases. The increase in surface area is also unexpected since reheating SVO ordinarily serves to sinter the material, resulting in a decreased surface area. Thus, the new synthesis protocol for a highly crystalline mixed metal oxide, such as highly crystalline ε-phase SVO, produces unexpected results.

Benefits attributed to the present synthesis process for the formation of an SVO cathode active material are illustrated by the following examples:

EXAMPLE 1

Silver vanadium oxide according to the current invention is prepared utilizing a first step decomposition reaction under an inert atmosphere. In particular, 15.52 grams of $V_2O_5$ was combined with 14.50 grams of $AgNO_3$. This 1:1 mole ratio mixture was heated to about 300° C. under a flowing argon atmosphere for about 16 hours. The sample was then cooled, mixed and reheated under a flowing argon atmosphere at about 500° C. for about 22 hours. At this point the intermediate SVO material was cooled and analyzed by x-ray powder diffraction (XRD) and BET surface area measurements. The x-ray powder diffraction data confirmed the mixed phase composition of the intermediate SVO material. A BET measurement indicated a surface area of about 0.20 m²/g.

12.5 grams of this intermediate SVO material was then heated to about 500° C. under a flowing air atmosphere for about 17 hours. The product was cooled and analyzed by x-ray powder diffraction and BET surface area measurements. The XRD pattern is displayed in FIG. 1 and indicates highly crystalline ε-phase (SVO) $Ag_2V_4O_{11}$. The BET surface area of the material was about 0.77 m²/g. According to the present invention, the surface area of the ε-phase SVO ranges from about 0.65 m²/g to about 0.85 m²/g, depending on the heating protocol used.

Silver nitrate has a melting point of 212° C. and its decomposition begins at 444° C. Vanadium oxide has a melting temperature of 690° C. and a decomposition temperature of 1,750° C. A 1:1 mole ratio of silver nitrate and vanadium oxide has a melting point of 207° C. and the mixture begins to decompose at 280° C. Therefore, according to the present invention, a mixture of silver nitrate and vanadium oxide for the preparation of ε-phase SVO begins with the decomposition reaction under an inert atmosphere at a temperature range of about 280° C. to about 550° C., and preferably at about 300° C. to about 500° C. Then, the second, oxidation reaction occurs at a temperature range of about 280° C. to about 550° C. Preferably, the oxidation reaction heating occurs at a similar temperature as the decomposition heating, or higher.

Heating times during the first decomposition reaction, whether there is one or more of them, and for the second oxidation reaction range from about 5 hours to about 30 hours. Longer heating times are required for lower heating temperatures. Further, while the present invention has been described in the examples as requiring two heating events with an ambient mixing in between for the decomposition reaction, that is not necessarily imperative. Some synthesis protocols may require one decomposition heating with periodic mixing, or multiple heating events with periodic ambient mixing. Suitable inert atmospheres include argon, helium, nitrogen and a vacuum. Also, the oxidation portion of the present synthesis can have more than one heating event.

The above melting points and decomposition temperatures are based on the reactants being in a 1:1 mole ratio. However, the mole ratio can be changed, which will consequently change the melting point and decomposition temperature of the resulting mixture. For example, if γ-phase SVO ($Ag_{0.74}V_2O_{5.37}$) is a desired product according to the present invention, the ratio of Ag:V is 1:0.8. On the other hand, if β-phase SVO ($Ag_{0.35}V_2O_{5.18}$) is the desired product, the ratio of Ag:V is 0.35:1.

COMPARATIVE EXAMPLE 1

For comparison, SVO was prepared by the prior art thermal decomposition method described in U.S. Pat. Nos. 4,310,609 and 4,391,729, both to Liang et al. In particular, 15.51 grams of $V_2O_5$ was combined with 14.49 grams of $AgNO_3$, and the mixture was heated to about 300° C. under a flowing air atmosphere for about 18 hours. The sample was then cooled, mixed, and reheated under a flowing air atmosphere at about 500° C. for about 22 hours. At this point the intermediate SVO material was cooled and analyzed by x-ray powder diffraction and BET surface area measurements.

Figure 2:
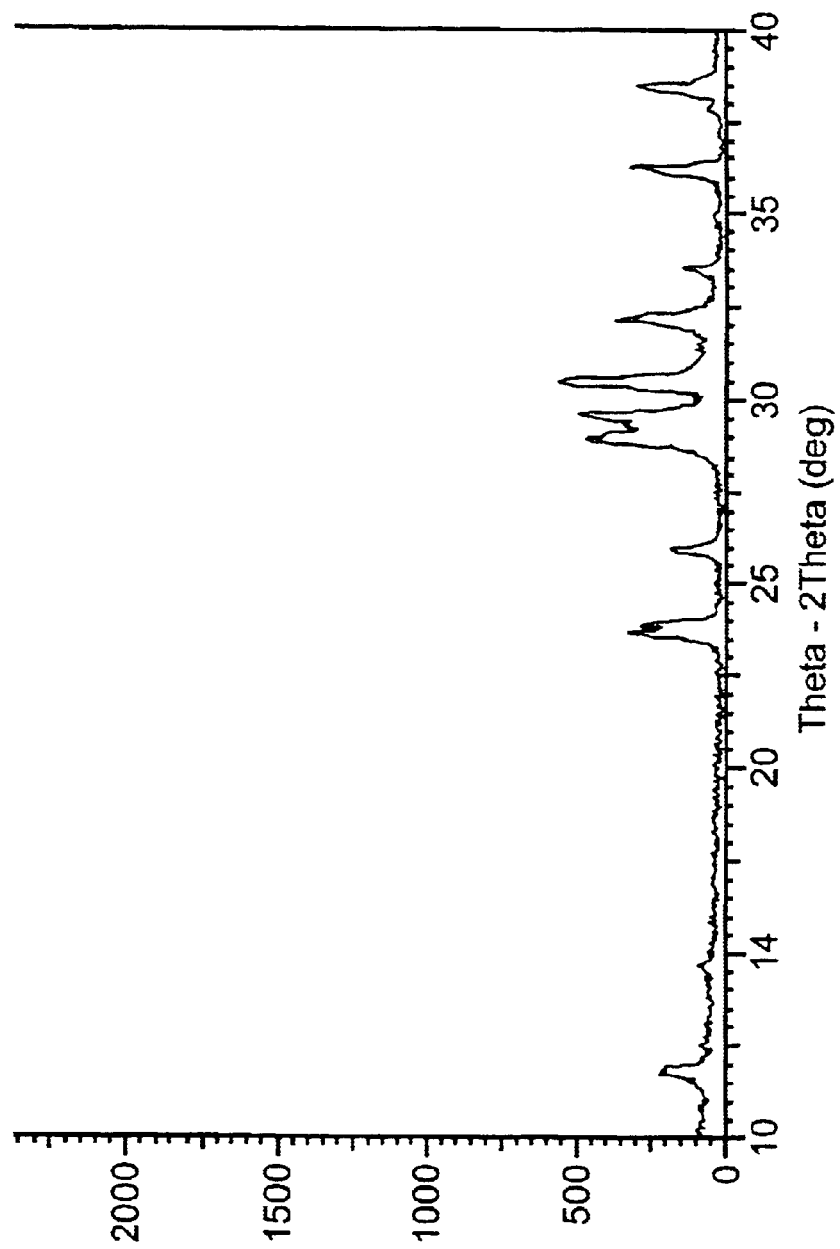

The XRD pattern for the product of Comparative Example 1 is shown in FIG. 2. Table 1 shows the FWHM of SVO materials prepared according to Example 1 and Comparative Example 1.

TABLE 1

Crystallinity of SVO Cathode Materials

| SVO Material | d-spacing (Å) | FWHM (deg.) |
| --- | --- | --- |
| Example 1 | 2.474 | 0.133 |
| Comparative Ex. 1 | 2.481 | 0.251 |
| Comparative Ex. 2 | 2.481 | 0.255 | d-spacing is the interplanar spacing, or the magnitude of the distance between two adjacent and parallel planes of atoms. It is a function of the Miller indices (h, k, and l) and the lattice parameters. It also refers to the peak position in the XRD pattern—it is calculated from the 2-theta value. The units are angstroms.

The present invention cathode active material of Example 1 (FIG. 1) possesses higher crystallinity than the prior art material prepared according to Comparative Example 1 (FIG. 2), as indicated by the FWHM measurement. In the previously discussed Scherrer equation, a smaller FWHM in the denominator results in a larger crystallinity (L) number. The BET surface area of the prior art material was about 0.35 m²/g, which is less than half the surface area of the material of Example 1.

COMPARATIVE EXAMPLE 2

SVO prepared at a relatively low temperature of about 375° C. in an oxidative decomposition reaction according to U.S. Pat. Nos. 4,310,609 and 4,391,729 to Liang et al. was subjected to further heat-treatment synthesis. This was done to compare SVO prepared by the prior art method described in U.S. Pat. No. 5,955,218 to Crespi et al. with the synthesis product of Example 1. In particular, a 1:1 mole ratio mixture of $V_2O_5$ and $AgNO_3$ was thermally decomposed under an air atmosphere using a series of temperatures ramping up from about 230° C., to about 260° C., to about 300° C., and finally to about 375° C. The resulting material was cooled and a BET surface area measurement yielded a value of about 1.14 m²/g.

Reheating the sample under air at about 510° C. for about 40 hours yielded a product material having a BET surface area of about 0.43 m²/g, which approximates the value of 0.35 m²/g found for the material prepared in Comparative Example 1. This decrease in surface area is consistent with the expected sintering of SVO material at high temperatures. Additionally, the FWHM measurement for this material shown in Table 1 is similar to that of Comparative Example 1. This means that the SVO material of the present invention is much more highly crystalline than the prior art materials, including that produced according to the Crespi et al. '218 patent. The conclusion is that reheating SVO initially prepared at 375° C. under an oxidizing atmosphere to a higher temperature provides a product material similar to that initially prepared at the high temperature. However, it is very different than the highly crystalline active material prepared via the two-step inert/oxidizing atmospheres syntheses illustrated in Example 1.

Figure 3:
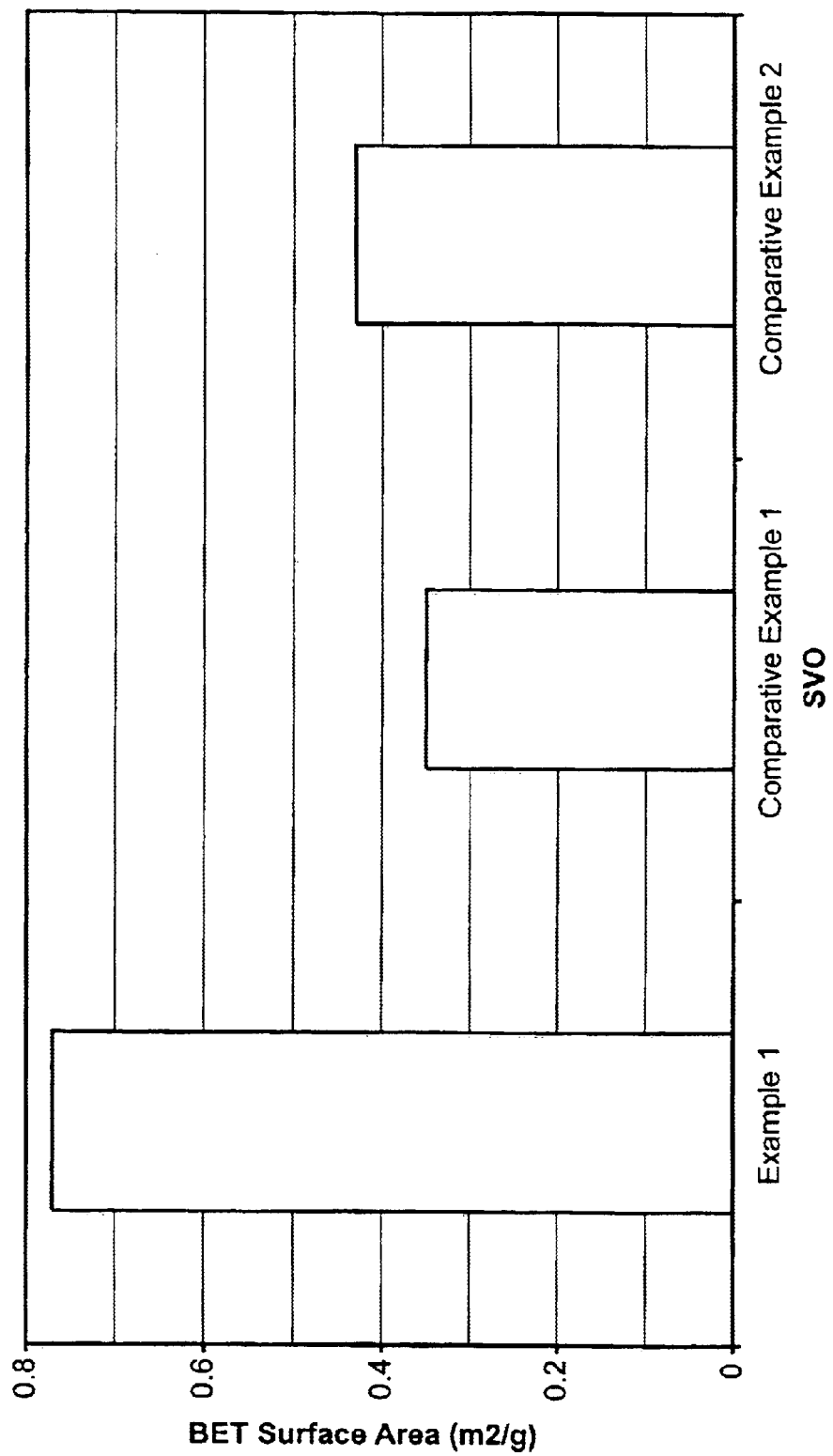
FIG. 3 depicts BET surface area data for SVO samples prepared under various syntheses conditions.

FIG. 3 shows a comparison of the BET surface area data for the product materials prepared in Example 1 and Comparative Examples 1 and 2.

EXAMPLE 2

The performance of primary lithium electrochemical cells was tested using SVO synthesized according to Example 1 of the present invention in comparison to the prior art SVO material prepared in Comparative Example 1. In particular, hermetically sealed cells were constructed containing cathodes consisting of a mixture of, by weight, 94% SVO mixed with 3% PTFE binder, 2% graphite, and 1% carbon black. This mixture was pressed onto an expanded titanium current collector screen. A total of 7.5 grams of cathode mix was utilized in each cell. Lithium metal in contact with an expanded nickel current collector screen was placed against a polypropylene separator facing the cathode. The cells were activated with an electrolyte of 1 M $LiAsF_6$ in a 50:50, by volume, mixture of propylene carbonate and 1,2-dimethoxyethane.

The cells were then pulse discharged by subjecting them to constant current pulses of 2.0 amps for 10 seconds in duration. The current pulses were applied in groups of four, with 15 seconds of rest between each pulse. These pulse trains were applied every 38 days, with a 10 kΩ background load applied between pulse trains. This long duration test attempts to mimic the discharge conditions experienced by a cell powering an implantable biomedical device, such as a cardiac pacemaker. Five cells from each group were placed on test at 37° C. The results are presented in Table 2.

TABLE 2

Pulse Discharge of Experimental Li/SVO Cells

| | Average Capacity (mAh) | | |
| --- | --- | --- | --- |
| SVO Type | Prepulse | Pulse 1 Min. V | Rdc |
| Example 1 | 2.610 | 2.239 | 0.186 |
| Comparative Example 1 | 2.607 | 2.196 | 0.205 |

Figure 4:
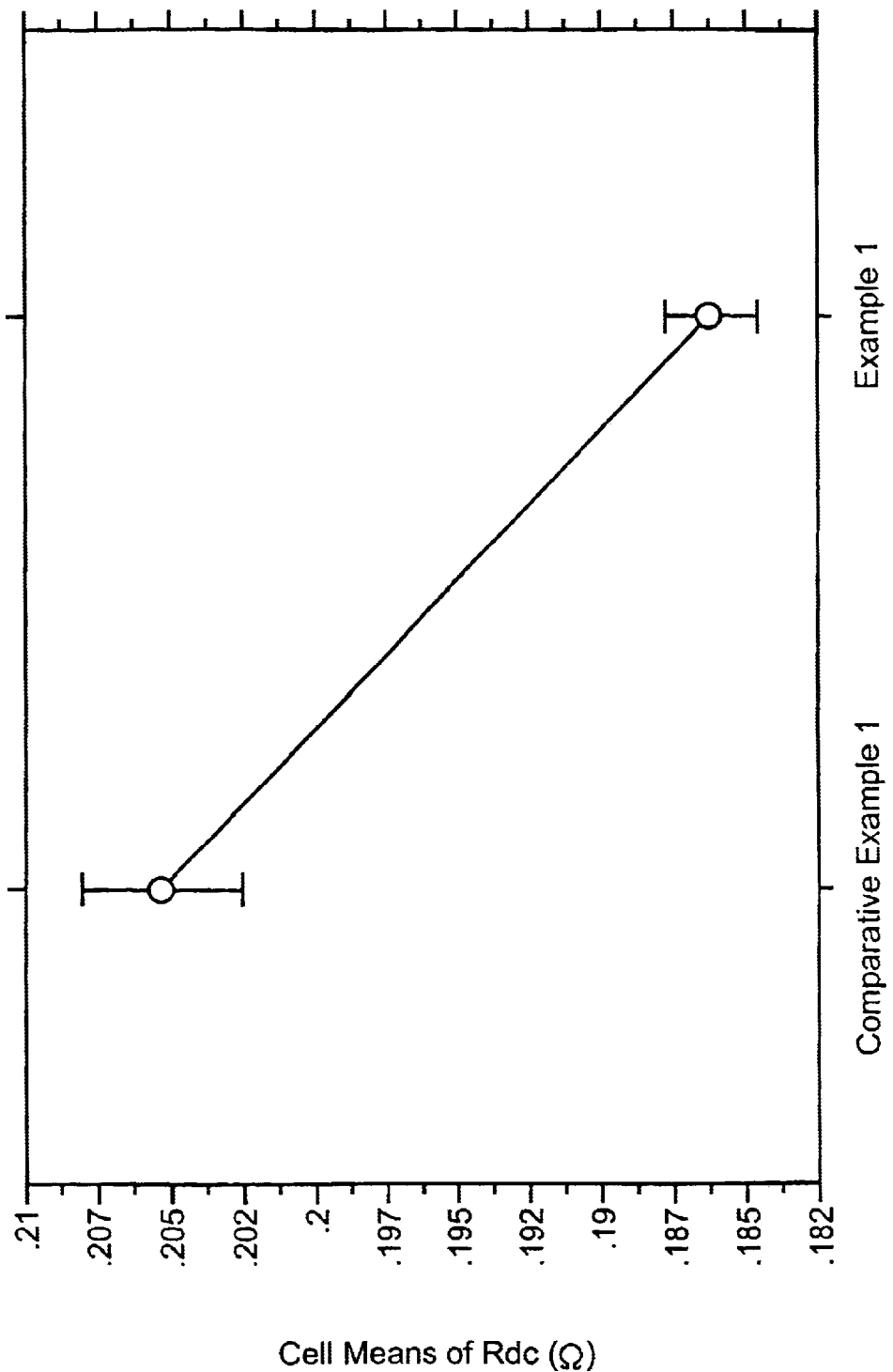
FIG. 4 shows Rdc data for electrochemical cells containing silver vanadium oxide prepared under various conditions.

As can be seen in Table 2, the lithium cells containing highly crystalline ε-phase SVO synthesized according to Example 1 provided higher average pulse voltages and lower average cell Rdc than the cells containing SVO prepared according to Comparative Example 1. Higher pulse voltages and lower cell Rdc provide a cell with higher deliverable capacity and longer life. An interaction analysis of the Rdc data from these cells is provided in the bar graph of FIG. 4. In this graph, 95% confidence limit error bars are included with the mean Rdc for each group.

The present highly crystalline SVO as a cathode active material provides an electrochemical cell possessing sufficient energy density and discharge capacity required for the vigorous requirements of implantable medical devices. These types of cells comprise a lithium anode or its alloys, for example, Li—Si, Li—Al, Li—B and Li—Si—B. The form of the anode may vary, but preferably it is of a thin sheet or foil pressed or rolled on a metallic anode current collector, i.e., preferably comprising titanium, titanium alloy or nickel. Copper, tungsten, aluminum and tantalum are also suitable materials for the anode current collector. The anode has an extended tab or lead of the same material as the anode current collector, i.e., preferably nickel or titanium, integrally formed therewith such as by welding and contacted by a weld to a cell case in a case-negative electrical configuration. Alternatively, the anode may be formed in some other geometry, such as a bobbin shape, cylinder or pellet to allow an alternate low surface cell design.

The cathode is the counter electrode for the cell and comprises the highly crystalline ϵ-phase SVO of the present invention. However, before the ϵ-phase SVO is fabrication into a cathode electrode, it is mixed with a binder material such as a powdered fluoro-polymer, more preferably powdered polytetrafluoroethylene or powdered polyvinylidene fluoride present at about 1 to about 5 weight percent of the cathode mixture. Further, up to about 10 weight percent of a conductive diluent is preferably added to the cathode mixture to improve conductivity. Suitable materials for this purpose include acetylene black, carbon black and/or graphite or a metallic powder such as powdered nickel, aluminum, titanium and stainless steel. The preferred cathode active mixture thus includes a powdered fluoro-polymer binder present at about 3 weight percent, a conductive diluent present at about 3 weight percent and about 94 weight percent of the cathode active material. For example, depending on the application of the electrochemical cell, the range of cathode compositions is from about 99% to about 80%, by weight, crystalline ϵ-phase silver vanadium oxide mixed with carbon graphite and PTFE.

Cathode components for incorporation into an electrochemical cell according to the present invention may be prepared by rolling, spreading or pressing the cathode active materials onto a suitable current collector selected from the group consisting of stainless steel, titanium, tantalum, platinum, gold, aluminum, cobalt-nickel alloys, nickel-containing alloys, highly alloyed ferritic stainless steel containing molybdenum and chromium, and nickel-, chromium- and molybdenum-containing alloys. The preferred current collector material is titanium. Cathodes prepared as described above may be in the form of one or more plates operatively associated with at least one or more plates of anode material, or in the form of a strip wound with a corresponding strip of anode material in a structure similar to a "jellyroll" or a flat-folded configuration.

In order to prevent internal short circuit conditions, the cathode is separated from the anode by a separator. The separator is of a fabric woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, polytetrafluoroethylene membrane commercially available under the designation ZITEX (Chemplast Inc.), polypropylene membrane commercially available under the designation CELGARD (Celanese Plastic Company, Inc.) and a membrane commercially available under the designation DEXIGLAS (C. H. Dexter, Div., Dexter Corp.).

The primary electrochemical cell includes a nonaqueous electrolyte having an inorganic, ionically conductive salt dissolved therein. More preferably, the electrolyte has a lithium salt dissolved in a mixture of a low viscosity solvent and a high permittivity solvent. The salt is selected from the group of $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3SCF_3$, $LiC_6F_5SO_3$, $LiO_2CCF_3$, $LiSO_6F$, $LiB(C_6H_5)_4$, $LiCF_3SO_3$, and mixtures thereof, and serves as the vehicle for migration of the anode ions to intercalate or react with the cathode active material.

Suitable low viscosity solvents include esters, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy,2-methoxyethane (EME), ethyl methyl carbonate, methyl propyl carbonate, ethyl propyl carbonate, diethyl carbonate, dipropyl carbonate, and mixtures thereof. High permittivity solvents include cyclic carbonates, cyclic esters and cyclic amides such as propylene carbonate (PC), ethylene carbonate (EC), butylene carbonate, acetonitrile, dimethyl sulfoxide, dimethyl, formamide, dimethyl acetamide, γ-valerolactone, γ-butyrolactone (GBL), N-methyl-pyrrolidinone (NMP), and mixtures thereof. The preferred electrolyte for a lithium primary cell is 0.8M to 1.5M $LiAsF_6$ or $LiPF_6$ dissolved in a 50:50 mixture, by volume, of PC as the preferred high permittivity solvent and DME as the preferred low viscosity solvent.

The preferred form of a primary alkali metal/solid cathode electrochemical cell is a case-negative design wherein the anode is in contact with a conductive metal casing and the cathode contacted to a current collector is the positive terminal. The cathode current collector is in contact with a positive terminal pin via a lead of the same material as the current collector. The lead is welded to both the current collector and the positive terminal pin for electrical contact.

A preferred material for the casing is titanium although stainless steel, mild steel, nickel-plated mild steel and aluminum are also suitable. The casing header comprises a metallic lid having an opening to accommodate the glass-to-metal seal/terminal pin feedthrough for the cathode electrode. The anode electrode is preferably connected to the case or the lid. An additional opening is provided for electrolyte filling. The cell is thereafter filled with the electrolyte solution described hereinabove and hermetically sealed, such as by close-welding a titanium plug over the fill hole. The cell of the present invention can also be constructed in a case-positive design.

It is appreciated that various modifications to the inventive concepts described herein may be apparent to those of ordinary skill in the art without departing from the spirit and scope of the present invention as defined by the appended claims.

What is claimed is:

1. An electrochemical cell having an anode, a cathode of electrically conductive material, and an ionically conductive electrolyte activating the anode and the cathode, wherein the electrically conductive material of the cathode is characterized as having been formed by a process consisting essentially of the sequential steps of:

a) forming a substantially homogeneous mixture of starting materials comprising a decomposable silver-containing constituent and a vanadium-containing constituent, wherein the homogeneous mixture is formed at a mixing temperature below a decomposition temperature of the mixture of the starting materials;

b) heating the homogeneous mixture in an inert atmosphere to effect decomposition and produce a mixed metal oxide intermediate;

c) heating the mixed metal oxide intermediate in an oxidizing atmosphere to produce a product mixed metal oxide; and d) contacting the product mixed metal oxide to a cathode current collector to form the cathode.

2. The electrochemical cell of claim 1 wherein the decomposable silver-containing constituent is silver nitrate.

3. The electrochemical cell of claim 1 wherein the vanadium-containing constituent is selected from the group consisting of $NH_4VO_3$, $AgVO_3$, $VO$, $VO_{1.27}$, $VO_2$, $V_2O_4$, $V_2O_3$, $V_3O_5$, $V_4O_9$, $V_6O_{13}$, $V_2O_5$, and mixtures thereof.

4. The electrochemical cell of claim 1 wherein the mixed metal oxide intermediate is cooled to an ambient temperature before being heated in the oxidizing atmosphere.

5. The electrochemical cell of claim 1 wherein the homogeneous mixture is heated to the decomposition temperature in the inert atmosphere and cooled to an ambient temperature below the decomposition temperature followed by a second heating to the decomposition temperature in the oxidizing atmosphere.

6. The electrochemical cell of claim 5 wherein the homogeneous mixture is re-mixed at the ambient temperature before the second heating to the decomposition temperature in the oxidizing atmosphere.

7. The electrochemical cell of claim 1 wherein the homogeneous mixture consists of silver nitrate and vanadium oxide in a 1:1 mole ratio and the decomposition temperature is at least about 280° C.

8. The electrochemical cell of claim 1 wherein the decomposition heating occurs in the inert atmosphere selected from the group consisting of argon, nitrogen, helium, and a vacuum.

9. The electrochemical cell of claim 1 wherein the product mixed metal oxide is selected from the group consisting of $Ag_{1.0}V_2O_{5.5}$, $Ag_{0.74}V_2O_{5.37}$ and $Ag_{0.35}V_2O_{5.18}$.

10. The electrochemical cell of claim 1 wherein the product mixed metal oxide is of the general formula $Ag_{1.0}V_2O_{5.5}$ having a surface area ranging from about 0.65 $m^2$/g to about 0.85 $m^2$/g.

11. The electrochemical cell of claim 1 wherein the cathode further comprises at least one of a binder material and a conductive additive.

12. The electrochemical cell of claim 11 wherein the binder material is a fluoro-resin powder.

13. The electrochemical cell of claim 11 wherein the conductive additive is selected from the group consisting of carbon, graphite powder, acetylene black and metallic powder selected from the group consisting of titanium, aluminum, nickel and stainless steel, and mixtures thereof.

14. The electrochemical cell of claim 1 wherein the anode is of lithium.

15. The electrochemical cell of claim 1 wherein the electrolyte activating the anode and the cathode comprises a lithium salt selected from the group consisting of $LiPF_6$, $LiAsF_6$, $LiSbF_6$, $LiBF_6$, $LiClO_4$, $Li_2O$, $LiAlCl_4$, $LiGaCl_4$, $Li(SO_2CF_3)_3$, $LiN(SO_2CF_3)_2$, $LiSO_3F$, $LiB(C_6H_5)_4$, $LiCF_3SO_3$, and mixtures thereof.

16. The electrochemical cell of claim 1 wherein the nonaqueous solvent comprises at least one organic solvent selected from the group consisting of tetrahydrofuran, methyl acetate, diglyme, trigylme, tetragylme, dimethyl carbonate, 1,2-dimethoxyethane, 1,2-diethoxyethane, 1-ethoxy, 2-methoxyethane, ethyl methyl carbonate, methyl propyl carbonate, ethyl propyl carbonate, diethyl carbonate, dipropyl carbonate, propylene carbonate, ethylene carbonate, butylene carbonate, acetonitrile, dimethyl sulfoxide, dimethyl, formamide, dimethyl acetamide, γ-valerolactone, γ-butyrolactone, N-methyl-pyrrolidinone (NMP), and mixtures thereof.

17. A cathode for an electrochemical cell, the cathode characterized as formed by a process consisting essentially of the sequential steps of:

a) forming a substantially homogeneous mixture of starting materials comprising vanadium oxide and decomposable silver-containing constituent, wherein the homogeneous mixture is formed at a mixing temperature below a decomposition temperature of the mixture of the starting materials;

b) heating the homogeneous mixture in an inert atmosphere to effect decomposition and produce a mixed metal oxide intermediate;

c) heating the mixed metal oxide intermediate in an oxidizing atmosphere to produce a product mixed metal oxide; and d) contacting the product mixed metal oxide to a cathode current collector to form the cathode.

18. The cathode of claim 17 wherein the product mixed metal oxide is selected from the group consisting of $Ag_{1.0}V_2O_{5.5}$, $Ag_{0.74}V_2O_{5.37}$ and $Ag_{0.35}V_2O_{5.18}$.

19. The cathode of claim 17 wherein the product mixed metal oxide is of the general formula $Ag_{1.0}V_2O_{5.5}$ having a surface area ranging from about 0.65 $m^2$/g to about 0.85 $m^2$/g.

20. The cathode of claim 17 wherein the cathode further comprises at least one of a binder material and a conductive additive.

21. The cathode of claim 17 wherein the decomposition temperature is at least about 280° C.

22. The cathode of claim 17 wherein the mixed metal oxide intermediate is cooled to an ambient temperature before being heated in the oxidizing atmosphere.

23. The cathode of claim 17 wherein the homogeneous mixture is heated to the decomposition temperature in the inert atmosphere and cooled to an ambient temperature below the decomposition temperature followed by a second heating to the decomposition temperature in the oxidizing atmosphere.

24. The cathode of claim 17 wherein the homogeneous mixture is re-mixed at the ambient temperature before the second heating to the decomposition temperature in the oxidizing atmosphere.

25. A method for providing an electrochemical cell, which comprises:

a) providing a casing;

b) providing an anode;

c) providing a cathode, consisting essentially of the steps of:

i) forming a substantially homogeneous admixture of starting materials comprising vanadium oxide and a decomposable silver-containing constituent, wherein the homogeneous mixture is formed at a mixing temperature below a decomposition temperature of the mixture of the starting materials;

ii) heating the homogeneous admixture in an inert atmosphere to effect decomposition and produce a mixed metal oxide intermediate;

iii) heating the mixed metal oxide intermediate in an oxidizing atmosphere to produce a product mixed metal oxide; and iv) contacting the product mixed metal oxide to a current collector; and d) positioning the anode and the cathode inside the casing; and e) activating the anode and the cathode with an electrolyte filled in the casing.

26. The method of claim 25 including providing the silver-containing constituent as silver nitrate.

27. The method of claim 25 including selecting the vanadium-containing constituent from the group consisting of $NH_4VO_3$, $AgVO_3$, $VO$, $VO_{1.27}$, $VO_2$, $V_2O_4$, $V_2O_3$, $V_3O_5$, $V_4O_9$, $V_6O_{13}$, $V_2O_5$, and mixtures thereof.

28. The method of claim 25 including cooling the mixed metal oxide intermediate to an ambient temperature before heating in the oxidizing atmosphere.

29. The method of claim 25 including heating the homogeneous mixture to the decomposition temperature in the inert atmosphere and then cooling it to an ambient temperature below the decomposition temperature followed by a second heating to the decomposition temperature in the oxidizing atmosphere.

30. The method of claim 25 including re-mixing the homogeneous mixture at the ambient temperature before the second heating to the decomposition temperature in the oxidizing atmosphere.

31. The method of claim 25 including providing the product mixed metal oxide selected from the group consisting of $Ag_{1.0}V_2O_{5.5}$, $Ag_{0.74}V_2O_{5.37}$ and $Ag_{0.35}V_2O_{5.18}$.

32. The method of claim 25 wherein the product mixed metal oxide is of the general formula $Ag_{1.0}V_2O_{5.5}$ having a surface area ranging from about 0.65 $m^2/g$ to about 0.85 $m^2/g$.

33. The method of claim 25 including providing the anode comprised of lithium.

34. The method of claim 25 including providing the electrolyte operatively associated with the anode and the cathode comprising an ion-forming alkali metal salt dissolved in a nonaqueous solvent.

* * * * *

UNITED STATES PATENT AND TRADEMARK OFFICE
CERTIFICATE OF CORRECTION

PATENT NO. : 6,872,490 B2
APPLICATION NO. : 10/214813
DATED : March 29, 2005
INVENTOR(S) : Leising et al.

Page 1 of 1

It is certified that error appears in the above-identified patent and that said Letters Patent is hereby corrected as shown below:

Col. 9 line 23, "$VO_{1\ 27}$" should read --$VO_{1.27}$--;
Col. 9 line 48, "$Ag_{1.0}V_2O_{5\ 5}$" should read --$Ag_{1.0}V_2O_{5.5}$--;
Col. 9 lines 50/51, "$Ag_{1\ 0}V_2O_{5.5}$" should read --$Ag_{1.0}V_2O_{5.5}$--;
Col. 10 line 35, "$Ag_{1.0}V_2O_{5\ 5}$, $Ag_{0.74}V_2O_{5.37}$ and $Ag_{0\ 35}V_2O_{5\ 18}$" should read --$Ag_{1.0}V_2O_{5.5}$, $Ag_{0.74}V_2O_{5.37}$ and $Ag_{0.35}V_2O_{5.18}$--; and
Col. 12 line 13, "$Ag_{1.0}V_2O_{5\ 5}$" should read --$Ag_{1.0}V_2O_{5.5}$--.

Signed and Sealed this

Tenth Day of June, 2008

JON W. DUDAS
*Director of the United States Patent and Trademark Office*